(12) United States Patent
Gordon et al.

(10) Patent No.: US 10,779,509 B2
(45) Date of Patent: *Sep. 22, 2020

(54) UNMANNED AERIAL VEHICLE FOR GENERATING GEOLOCATION EXCLUSION ZONES

(71) Applicant: INTERNATIONAL BUSINESS MACHINES CORPORATION, Armonk, NY (US)

(72) Inventors: Michael S. Gordon, Yorktown Heights, NY (US); James R. Kozloski, New Fairfield, CT (US); Ashish Kundu, Elmsford, NY (US); Peter K. Malkin, Ardsley, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,588

(22) Filed: Feb. 4, 2020

(65) Prior Publication Data

US 2020/0170219 A1 Jun. 4, 2020

Related U.S. Application Data

(63) Continuation of application No. 15/048,428, filed on Feb. 19, 2016, now Pat. No. 10,609,901.

(51) Int. Cl.
*A01K 11/00* (2006.01)
*A01K 15/00* (2006.01)
(Continued)

(52) U.S. Cl.
CPC ............ *A01K 11/00* (2013.01); *A01K 11/008* (2013.01); *A01K 15/00* (2013.01); *A01K 15/021* (2013.01);
(Continued)

(58) Field of Classification Search
CPC ............ B64C 2201/00; B64C 2201/12; B64C 2201/123; B64C 39/02; B64C 39/024;
(Continued)

(56) References Cited

U.S. PATENT DOCUMENTS 5,774,088 A   6/1998  Kreithen
7,106,216 B1  9/2006  Maher
(Continued)

FOREIGN PATENT DOCUMENTS

DE    202014009166 U1   12/2014
WO    WO2013043636 A2   3/2013

OTHER PUBLICATIONS

List of IBM Patents or Patent Applications Treated as Related dated Feb. 4, 2020, 2 pages.
(Continued)

*Primary Examiner* — Richard R. Green
*Assistant Examiner* — Steven J Shur
(74) *Attorney, Agent, or Firm* — Tutunjian & Bitetto, P.C.; Anthony Curro

(57) ABSTRACT

An unmanned aerial vehicle for determining geolocation exclusion zones of animals. The unmanned aerial vehicle includes a processor-based monitoring device to track geolocation information associated with an animal from the unmanned aerial vehicle, an identification device mounted on the unmanned aerial vehicle to identify the animal and to track a position of the animal over time, and a mapping device coupled to the monitoring device to determine locations where the animal has traversed and to identify where an encounter with the animal is reduced.

20 Claims, 8 Drawing Sheets

(51) Int. Cl.
  *A01K 29/00* (2006.01)
  *B64C 39/00* (2006.01)
  *B64C 39/02* (2006.01)
  *A01K 15/02* (2006.01)

(52) U.S. Cl.
  CPC ............ *A01K 29/00* (2013.01); *A01K 29/005* (2013.01); *B64C 39/00* (2013.01); *B64C 39/02* (2013.01); *B64C 39/024* (2013.01); *B64C 2201/12* (2013.01); *B64C 2201/123* (2013.01)

(58) Field of Classification Search
  CPC .... A01K 11/00; A01K 11/008; A01K 15/021; A01K 29/005
  USPC ........................................ 244/17.23; 119/300
  See application file for complete search history.

(56) References Cited

U.S. PATENT DOCUMENTS

| | | | |
|---|---|---|---|
| 7,966,963 B1 | 6/2011 | Caldwell et al. | |
| 8,279,109 B1 | 10/2012 | Piesinger | |
| 8,576,112 B2 | 11/2013 | Garrec et al. | |
| 8,598,998 B2 | 12/2013 | Vassilev et al. | |
| 9,047,675 B2 | 6/2015 | Tillotson | |
| 9,715,235 B2 * | 7/2017 | McGrew | G05D 1/0088 |
| 2010/0201525 A1 | 8/2010 | Bahat et al. | |
| 2013/0257641 A1 | 10/2013 | Ronning | |
| 2013/0340305 A1 * | 12/2013 | Mobley | A01K 11/008 40/300 |
| 2014/0032034 A1 | 1/2014 | Raptopoulos et al. | |
| 2014/0261151 A1 * | 9/2014 | Ronning | A01M 29/10 116/22 A |
| 2017/0202185 A1 * | 7/2017 | Trumbull | G16H 40/67 |

OTHER PUBLICATIONS

Mell, Peter, et al., "The NIST Definition of Cloud Computing," 2011, 7 pages.

Mel, P. et al., "The NIST Definition of Cloud Computing: Recommendations of the National Institute of Standards and Technology," U.S. Department of Commerce Special Publication 800-145, Sep. 2011. (pp. 1-7).

* cited by examiner

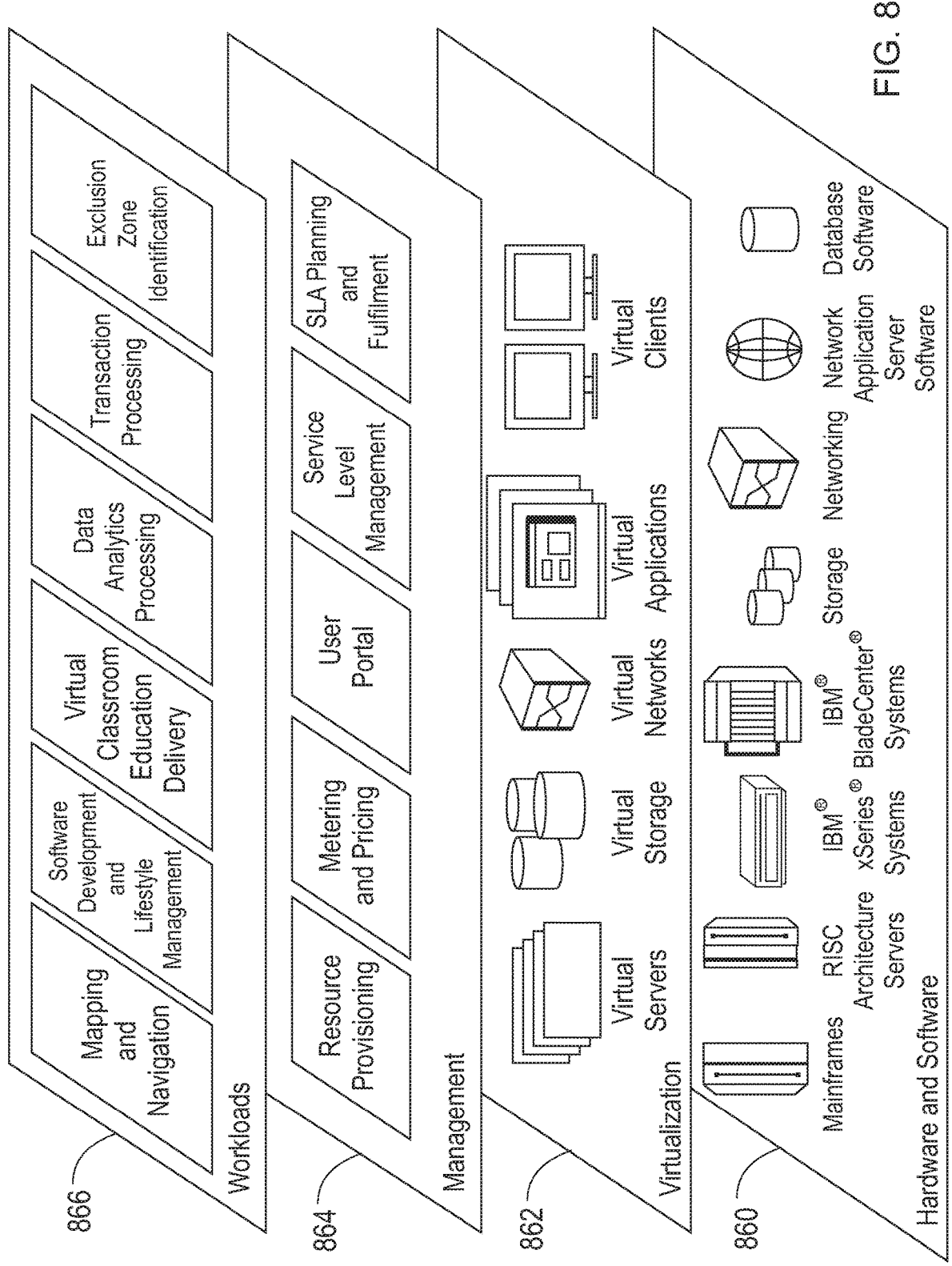

UNMANNED AERIAL VEHICLE FOR GENERATING GEOLOCATION EXCLUSION ZONES

BACKGROUND

Technical Field

The present invention relates generally to an unmanned aerial vehicle and, in particular, to an unmanned aerial vehicle for generating geolocation exclusion zones of animals.

Description of the Related Art

Human interaction with wild animals is a concern due to increasing population density, especially in rural environments, and the development of areas at or near wildlife habitats, including parks, nature reserves, etc. In addition, the degradation of wildlife habitats and changes in the environment have caused wild animals to alter their migration patterns, thereby leading to further potential unintentional interactions between humans and wildlife. These interactions may result in injuries and/or loss of life to the human and/or the wild animal, as well as damage to and/or destruction of property, including personal property, buildings, planes, communication equipment, etc.

Current conflict management strategies enacted to prevent interactions and/or aid in the event of interaction between humans and wild animals include controlling size and location of wild animal populations, relocation of animal populations, and delineating/establishing habitat barriers by way of natural or man-made barriers (e.g., electric fencing). Such strategies, however, often involve further active interactions between humans and wild animals and/or are ineffective in determining evolving geolocation of wild animals.

SUMMARY

According to an aspect of the present principles, an unmanned aerial vehicle for determining geolocation exclusion zones of animals is provided. The unmanned aerial vehicle may include a processor-based monitoring device to track geolocation information associated with at least one animal from the unmanned aerial vehicle, an identification device mounted on the unmanned aerial vehicle to identify the at least one animal and to track a position of the at least one animal over time, and a mapping device coupled to the monitoring device to determine locations where the at least one animal has traversed and to identify where an encounter with the at least one animal is reduced.

According to another aspect of the present principles, a method for determining geolocation exclusion zones of animals using an unmanned aerial vehicle is provided. The method may include tracking, using a processor-based monitoring device, geolocation information associated with at least one animal from the unmanned aerial vehicle, identifying the at least one animal and tracking a position of the at least one animal over time, and determining locations where the at least one animal has traversed and identifying where an encounter with the at least one animal is reduced.

According to another aspect of the present principles, a non-transitory computer readable storage medium for determining geolocation exclusion zones of animals using an unmanned aerial vehicle is provided. The non-transitory computer readable storage medium may include a computer readable program for generating geolocation exclusion zones of animals using an unmanned aerial vehicle, wherein the computer readable program, when executed on a computer, causes the computer to execute tracking, using a processor-based monitoring device, geolocation information associated with at least one animal from the unmanned aerial vehicle, identifying the at least one animal and tracking a position of the at least one animal over time, and determining locations where the at least one animal has traversed and identifying where an encounter with the at least one animal is reduced.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 8 shows exemplary abstraction model layers, in accordance with an embodiment of the present principles.

DETAILED DESCRIPTION

Figure 1:
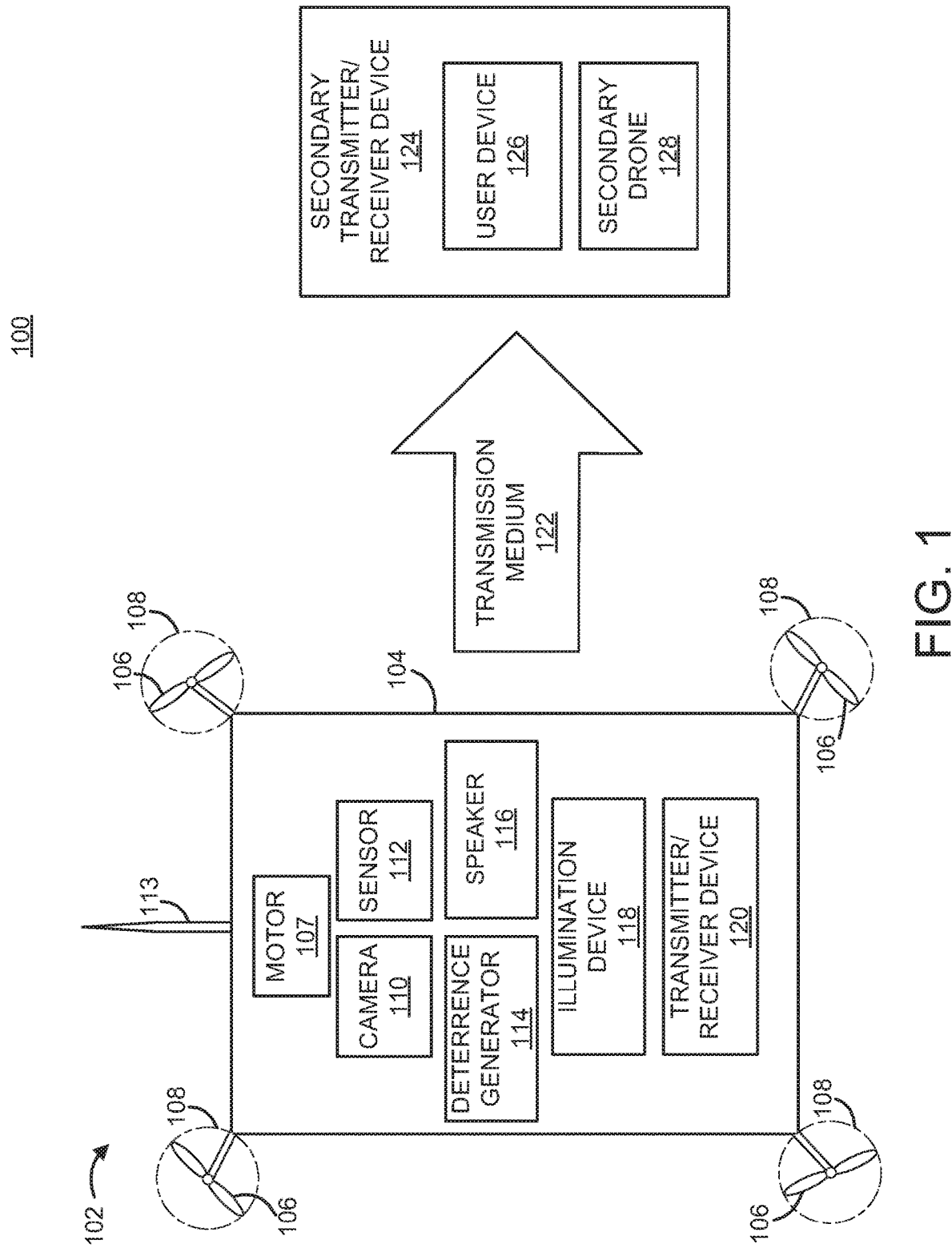
FIG. 1 shows an exemplary system for determining geolocation exclusion zones of animals using an unmanned aerial vehicle, in accordance with an embodiment of the present principles.

The present principles are directed to an unmanned aerial vehicle for determining geolocation exclusion zones of animals. In some embodiments, the present principles provide a system, method and computer program product to monitor evolving geolocation of wild animals and/or migration patterns of wild animals, while minimizing direct interactions between humans and wild animals. In some embodiments, the system, method and computer program product described herein may detect and/or track wild animals and generate geolocation exclusion zones based on location information associated with a detected animal. In further embodiments, the system, method and computer program product provided herein may enable the unmanned aerial vehicle to determine characteristics and/or level of risk of the detected animal and provide deterrence action based on risk analysis of the detected animal.

It should be understood that the word "animal" is used loosely and is not intended to suggest any limitation as to the scope of use or functionality of embodiments of the present principles described herein. For example, "animal" may refer to, but is not limited to, any wildlife species, stray animals and/or non-domesticated animals, etc.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring to the drawings in which like numerals represent the same or similar elements and initially to FIG. 1, an exemplary system 100 for determining geolocation exclusion zones of animals using an unmanned aerial vehicle 102 is illustratively depicted. It should be understood by one of ordinary skill in the art that the unmanned aerial vehicle 102 may comprise a drone, a drone-like unit, or a similarly functioning device.

The unmanned aerial vehicle 102 may include a housing unit 104, at least one movement mechanism 106, and a motor 107. The components of the unmanned aerial vehicle 102 may be affixed on the outside of the housing unit 104, or alternatively, may be enclosed within the housing unit 104 of the unmanned aerial vehicle 102. The unmanned aerial vehicle 102 may also include other elements (not shown) or may omit some elements as shown, as readily contemplated by one skilled in the art.

In some embodiments, the at least one movement mechanism 106 may include a single propeller, a plurality of propellers, a propulsion mechanism, or similarly functioning devices. In one embodiment, the at least one movement mechanism may be powered by at least one motor 107 and a power supply (not shown) to provide movement for the unmanned aerial vehicle. The movement mechanism(s) 106 may be placed at any desired location on the unmanned aerial vehicle 102, such that the placement of the movement mechanism(s) 106 does not interfere with each other or with another component positioned on the unmanned aerial vehicle 102. In one embodiment, the at least one movement mechanism 106 may be positioned on at least one extension arm (not shown) such that the at least one extension arm connects the at least one movement mechanism 106 to the housing unit 104.

Figure 3:
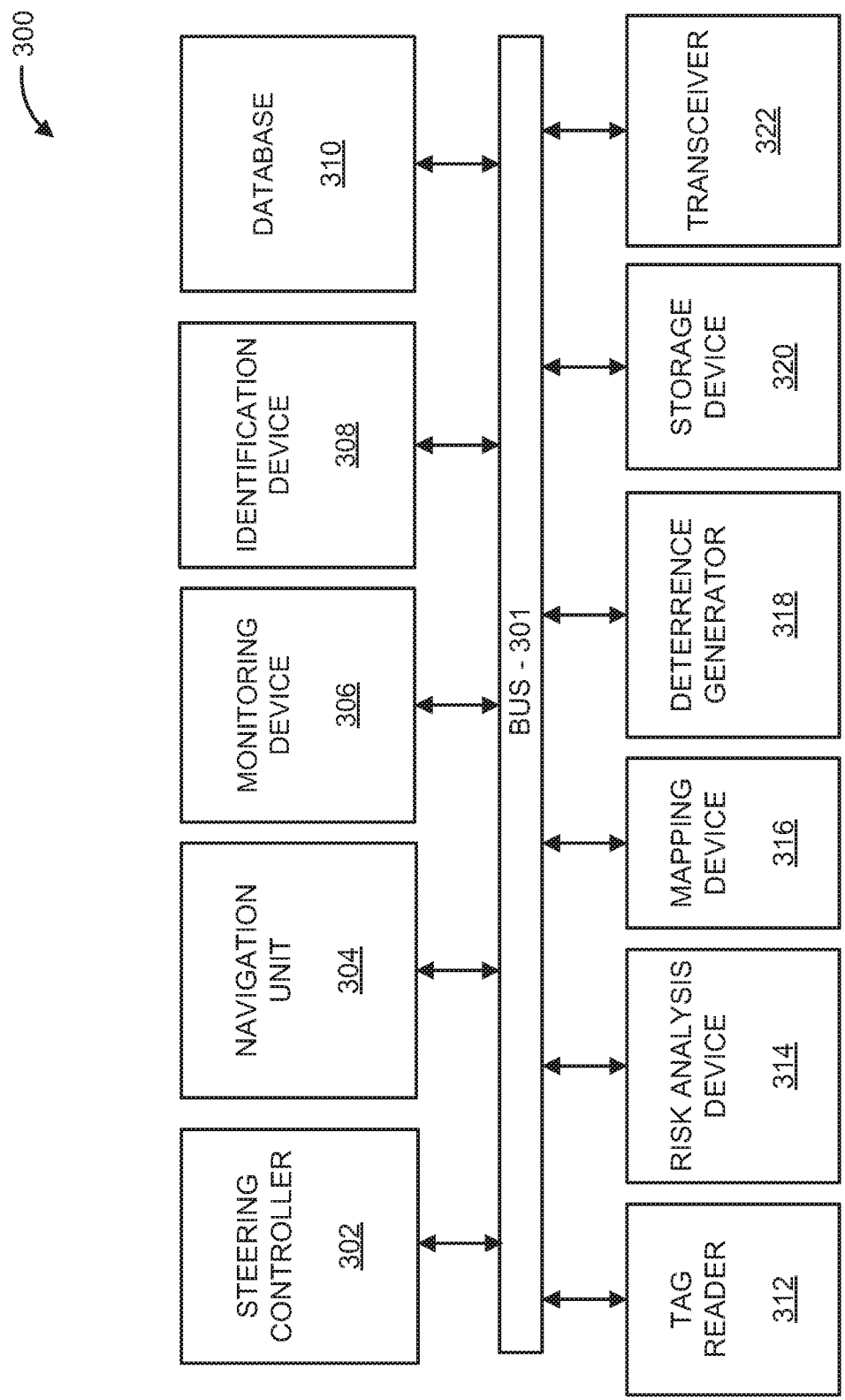
FIG. 3 shows an exemplary system for determining geolocation exclusion zones of animals using an unmanned aerial vehicle, in accordance with an embodiment of the present principles.

In one embodiment, the movement mechanism 106 and/or motor 107 provides aerial movement for the unmanned aerial vehicle 102 in multiple degrees of freedom. Multiple degrees of freedom generally refers to the ability for the unmanned aerial vehicle 102 to move in a three-dimensional space. Specifically, the movement mechanism 106 and/or motor 107 may be controlled by a steering controller 302, as illustrated in FIG. 3, to move the unmanned aerial vehicle 102 along three perpendicular axes, namely forward/backward movement, up/down movement, and left/right movement. In addition, the steering controller 302 may control the movement of the unmanned aerial vehicle in 360 degree rotation, tilting forward/backward movement (e.g., pitching), swiveling left/right movement (e.g., yawing), and pivoting side to side movement (e.g., rolling).

In one embodiment, the movement mechanism(s) 106 and/or motor 107 provides movement for the unmanned aerial vehicle 102 to, for example, detect geolocation information for exclusion zones and/or move the unmanned aerial vehicle 102 out of range of an animal depending on the animal's characteristics and/or likelihood of attack, which will be described in further detail below. In further embodiments, the movement mechanism(s) 106 and/or motor 107 provides movement for the unmanned aerial vehicle 102 to move the unmanned aerial vehicle 102 away from a detected migration route of an animal. In yet a further embodiment, the movement mechanism(s) 106 and/or motor 107 provides movement for the unmanned aerial vehicle 102 to avoid collision between the unmanned aerial vehicle 102 and an object, such as an animal, a tree, a building, and/or other structures.

In an embodiment, the unmanned aerial vehicle 102 may include at least one sound baffle 108. The sound baffle 108 may include a structure and/or device configured to reduce and/or mitigate sound (e.g., noise) and/or vibration generated from, for example, the movement mechanism(s) 106 and/or motor 107. The at least one sound baffle 108 may include, but is not limited to, a noise barrier constructed on the outward perimeter of the rotating movement mechanism(s) 106, an absorbent material and/or interior coating (not shown) applied to the housing unit 104 and/or within the movement mechanism(s) 106 and/or motor 107 configured to absorb sound energy, or any other device to mitigate and/or suppress noise generated by the unmanned aerial vehicle 102.

In some embodiments, the unmanned aerial vehicle 102 may be configured to engage and/or deploy the at least one sound baffle 108 once a deterrence action is generated by the deterrence generator 114, as will be described in further detail below. For example, the unmanned aerial vehicle 102 may deploy the sound baffle 108, such as a lightweight sound-damping material, near the at least one movement mechanism 106 and/or motor 107 when the unmanned aerial vehicle 102 is located in an area where decreased noise is desirable, such as a sensitive location. In some embodiments, the sound baffle 108 may be retracted and/or disengaged once the unmanned aerial vehicle 102 relocates from the sensitive location and/or determines that ameliorative action is no longer needed.

The unmanned aerial vehicle 102 may further include at least one camera 110, at least one sensor 112, a deterrence generator 114, a speaker 116, an illumination device 118, and a transmitter/receiver device 120. The camera 110 may be configured to provide visual feedback to the unmanned aerial vehicle 102, such as one or more still images and/or video feedback. For example, the camera 110 may be employed to detect and/or track moving objects (e.g., animals), stationary objects (e.g., trees, buildings, etc.), animal nesting areas, animal migration routes, and/or expressions of an animal (e.g., gazed fix on the unmanned aerial vehicle 102, arched back, etc.).

In some embodiments, the camera 110 may be placed on the unmanned aerial vehicle 102 such that the camera may provide visual feedback in 360 degrees on a horizontal plane and/or 360 degrees on a vertical plane of the unmanned aerial vehicle 102. In some embodiments, the camera 110 may include a plurality of cameras to provide visual feedback in all directions surrounding the unmanned aerial vehicle 102 such that there are no obscurations of the visual field (e.g., blind spots). In further embodiments, the camera 110 may be embedded within the housing unit 104 so as to prevent any negative effects to the aerodynamics of the unmanned aerial vehicle 102.

In an embodiment, the camera 110 may provide images of geolocations corresponding to an animal, such as where animals are detected, animal migration routes, and/or animal nesting sites, to generate exclusion zones. For example, the camera 110 may acquire an image of an animal and/or image of a geolocation including and/or associated with at least one animal, and using a monitoring device and/or an identification device, such as monitoring device 306 and/or identification device 308 in FIG. 3, the unmanned aerial vehicle 102 may track and/or identify one or more animals, such as endangered species, and may provide corresponding geolocation information, such as map coordinates, to generate exclusion zones (e.g., areas having endangered species, areas in which human interactions should be avoided and/or limited, etc.). In an embodiment, the camera 110 may obtain images of geolocations and, in combination with a global positioning system (GPS), such as navigation unit 304 in FIG. 3, the camera 110 may provide coordinate information associated with the captured images. In some embodiments, the unmanned aerial vehicle 102 may employ at least one processer to process machine vision methods and/or machine learning methods. For example, the camera 110 may obtain at least one image and the monitoring device 306 may employ various imaging processing techniques to extract information, such as animal type, animal population, animal location, etc., to generate and/or determine exclusion zones.

In one embodiment, the camera 110, which may include at least one processor, may be configured to detect one or more animals and may identify the type of animal detected. It should be understood that the word "animal" should be interpreted loosely and may include, but is not limited to, any wildlife in any stage of development (e.g., egg form, fully developed, etc.). The camera 110 may capture one or more still images or video images and, using a database, may perform image comparison with database images to determine the type of animal detected. In some embodiments, the camera 110 and/or processor may employ deep neural networks (DNNs), including a three-layer perception neural network with high accuracy, to identify different animals such that any exclusion zones and/or deterrence actions are "smart", namely that the exclusion zones and/or deterrence actions are based on animal type, specific animal characteristics, and/or animal histories.

In another embodiment, the camera 110 may provide visual feedback of nesting sites of animals and/or migration routes associated with an animal. For example, the camera 110 may capture an image of one or more nests and, using image comparison, may compare the captured image to database images to determine one or more of the following: type of nest, type of egg located in nest, number of eggs in the nest, type of animal located in nest, type of animal associated with nest and/or egg, amount of nests within the geolocation, etc. In some embodiments, the camera 110 may capture an image of footprint images associated with an animal and, using image comparison techniques, may track a migration route associated with the animal. The camera 110 may provide images of the nesting site, images of the migration route, and/or geolocation coordinate information corresponding to the nesting site and/or migration route to generate exclusion zones.

In a further embodiment, the camera 110 may be configured to provide visual feedback of obstacles in the path of the unmanned aerial vehicle 102 for any purpose, such as, but not limited to, navigation guidance to the unmanned aerial vehicle 102. It should be understood that various types of cameras are contemplated, including night-vision enabled cameras, infrared sensing cameras, X-ray imaging devices, line scan imaging devices, etc.

In an embodiment, the unmanned aerial vehicle 102 may include at least one sensor 112. The sensor 112 may include, but is not limited to, an acoustic sensor (e.g., microphone), a chemical sensor, an infrared sensor, an optical sensor, a collision avoidance sensor (e.g., a proximity sensor), a heat sensor, etc. In an embodiment, the sensor 112 may be configured to detect sounds made by the detected animal, such as chirping, honking, growling, roaring, and/or any sounds made by an animal, including sounds associated with stress, anger, fear, etc. In some embodiments, the sensor 112 may detect and/or track at least one animal using, for example, heat sensing.

In a further embodiment, the sensor 112 may be configured to detect proximity to objects and/or obstacles in the path of the unmanned aerial vehicle 102 for any purpose such as, but not limited to, navigation guidance to the unmanned aerial vehicle 102. The sensor 112 may be configured to determine a distance between the unmanned aerial vehicle 102 and the detected object. In addition, a deterrence action may be generated if the distance between the unmanned aerial vehicle 102 and the detected object becomes unsafe to avoid a collision between the unmanned aerial vehicle 102 and the detected animal. For example, if the sensor 112 detects an oncoming animal, the unmanned aerial vehicle 102 may relocate itself via the movement mechanism(s) 106 and/or motor 107.

In some embodiments, the sensor 112 may further enhance operating efficiency of the unmanned aerial vehicle 102 by directing at least one antenna 113 associated with the sensor 112 toward a detected object, such as an animal. For example, after an object is detected by the sensor 112, such as a proximity sensor, the antenna 113 may be directed towards the detected object to provide more accurate readings. The antenna 113 may be directed by, for example, rotation of the unmanned aerial vehicle 102 and/or movement of the antenna in a horizontal and/or vertical motion toward the detected object. In some embodiments, the sensor 112 may activate the movement mechanism(s) 106, motor 107, sound baffle 108, camera 110, deterrence generator 114, illumination device 118, and/or the transmitter/receiver device 120 upon detection of an object.

The unmanned aerial vehicle 102 may include a deterrence generator 114. In an embodiment, the deterrence generator 114 may be configured to generate deterrence action for the unmanned aerial vehicle 102 such that interactions between the unmanned aerial vehicle 102 and the animal are avoided. For example, the deterrence generator 114 may provide relocation information to the unmanned aerial 102, such that the unmanned aerial vehicle 102 is redirected and/or moved to another location to avoid interactions with the detected animal and/or prevent collision. Relocation information may be provided by the deterrence generator 114 when, for example, the camera 110 acquires an image of an animal approaching the unmanned aerial vehicle 102, and/or the sensor 112 detects an approaching animal and/or growling of the animal aimed toward the unmanned aerial vehicle 102. For example, the deterrence generator 114 may redirect the unmanned aerial vehicle 102 when the unmanned aerial vehicle 102 enters a predefined radius of an animal, as determined by the camera 110 and/or sensor 112.

In an embodiment, the deterrence generator 114 may reduce the noise generated by the unmanned aerial vehicle 102 by, for example, employing the sound baffle(s) 108 and/or temporarily turning the movement mechanism(s) 106 and/or motor 107 to an "off" position. In an embodiment, the deterrence generator 114 may determine the noise level of the unmanned aerial vehicle 102 and/or reduce the speed of the movement mechanism(s) 106 to minimize the noise generated by the unmanned aerial vehicle 102.

In a further embodiment, the deterrence generator 114 may transmit harmless signals, such as electromagnetic signals, microwave energy, microwave radiation, etc., towards an oncoming animal and/or detected animal to deter the animal from a particular geolocation, using, for example, a transmitter/receiver device 120. For example, the deterrence generator 114 may be configured to radiate pulses of microwave energy having a frequency in the range of 1 GHz to 40 GHz to alert, warn and/or deter animals within the vicinity of the unmanned aerial vehicle 102 and/or a particular geolocation.

In some embodiments, the frequency range may be emitted within a specific range that is sensed by the detected animal, such as a known frequency range that is detected by the specific animal. For example, the unmanned aerial vehicle 102 may detect an animal and select a particular frequency for the electromagnetic signal that is known to cause a response in the detected animal. Accordingly, the frequency of the electromagnetic signal may be generated by the deterrence generator 114 based on the particular biological features of the detected animal. The frequency of the signals may be sensed by the animal's auditory system, thereby attaining the animal's attention of the geolocation of the unmanned aerial vehicle 102 and may cause the animal to avoid such geolocation.

In some embodiments, the deterrence generator 114 may transmit harmless signals of a fixed frequency once an animal is detected by, for example, the sensor 112 (e.g., proximity sensor). In further embodiments, the deterrence generator 114 may transmit harmless signals of a selected frequency based on the biological features of the detected animal when the biological features of the animal is determined by, for example, the camera 110. It should be understood that the frequency of the electromagnetic signals is fixed and/or selected such as to not cause harm to the detected animal and/or any secondary animal and/or human within the vicinity of the unmanned aerial vehicle 102.

In another embodiment, the deterrence generator 114 may generate a sound signal, such as an audible beep, and/or a light signal, to deter the animal and/or produce an avoidance response by the animal. The sound signal may be transmitted towards the animal via a speaker 116 attached to the unmanned aerial vehicle 102. Similarly, the light signal, which may include a laser light beam, ultraviolet light (UV), etc., may be transmitted via an illumination device 118, such as a light source, attached to the unmanned aerial vehicle 102. The light and/or sound signal may have a wavelength, intensity, frequency, and/or duration sufficient to generate an avoidance response by the animal. The avoidance response may include, but is not limited to, the animal avoiding the geolocation of the unmanned aerial vehicle 102 and/or the unmanned aerial vehicle 102 itself. In a further embodiment, the deterrence generator 114 may be configured to mimic predator behavior to produce an avoidance response by the detected animal. For example, the deterrence generator 114 may generate a sound made by a predator via the speaker 116, such that the detected animal avoids any interaction with the unmanned aerial vehicle 102, which is described in further detail below.

The unmanned aerial vehicle 102 may include a transmitter/receiver device 120. The transmitter/receiver device 120 may be configured to provide feedback information to/from the unmanned aerial vehicle 102 and a secondary transmitter/receiver device 124 via a transmission medium 122. For example, the transmitter/receiver device 120 may provide at least one of the following to the secondary transmitter/receiver device 124: images and/or video feedback from the camera 110, audio and/or proximity information from the sensor 112, a list of deterrence actions generated by the deterrence generator 114, geolocation information of detected animals, geolocation exclusion zones, etc.

The secondary transmitter/receiver device 124 may include, but is not limited to, a user device 126 (e.g., a mobile device, tablet, computing device, etc.), a secondary drone 128, or similarly functioning devices. For example, the user device 126 may include a computing device used by air traffic controllers and/or pilots, such as navigation systems, radar systems, etc. In an embodiment, the user device 126 may receive information regarding the geolocation of an animal, animal population information, identification information of the animal, geolocation information of a particular animal, exclusion zone information, etc., and use such information to avoid the identified geolocations and to reduce and/or prevent human interactions with the animals in such geolocations. For example, geolocation information regarding an animal's presence along a flight plan of an aircraft may be employed by the user device 126 to alter the aircraft's flight plan, such that collision between the animal and the aircraft is prevented.

In another embodiment, feedback information to/from the unmanned aerial vehicle 102 may be transmitted to and/or received by a secondary drone 128. For example, a plurality of drones may detect and/or communicate information regarding geolocation of a group of animals, animal population information, identification information of animals, geolocation information of a particular animal, and/or nesting sites of animals, to further generate geolocation information of exclusion zones which may evolve over time. In a further embodiment, the unmanned aerial vehicle 102 may communicate with the secondary drone 128 to distract an animal in a harmless manner, while the unmanned aerial vehicle 102 leaves the vicinity of the animal. In addition, the secondary drone 128 may be configured to generate an avoidance response by the animal. For example, if an animal is approaching the unmanned aerial vehicle 102, the unmanned aerial vehicle 102 may communicate with the secondary drone 128, such that the secondary drone 128 engages in interaction and/or distracts the animal for a predetermined amount of time sufficient for the unmanned aerial vehicle 102 to leave the geolocation of the animal.

It is to be appreciated that system 200 described below with respect to FIG. 2, and system 300 described below with respect to FIG. 3, are systems for implementing respective embodiments of the present principles. Part or all of processing system 100 may be implemented in one or more of the elements of system 200 of FIG. 2 and/or system 300 of FIG. 3. Further, it is to be appreciated that processing system 100, 200 and/or 300 may perform at least part of the method described herein, including, for example, at least part of method 400 of FIG. 4.

Figure 2:
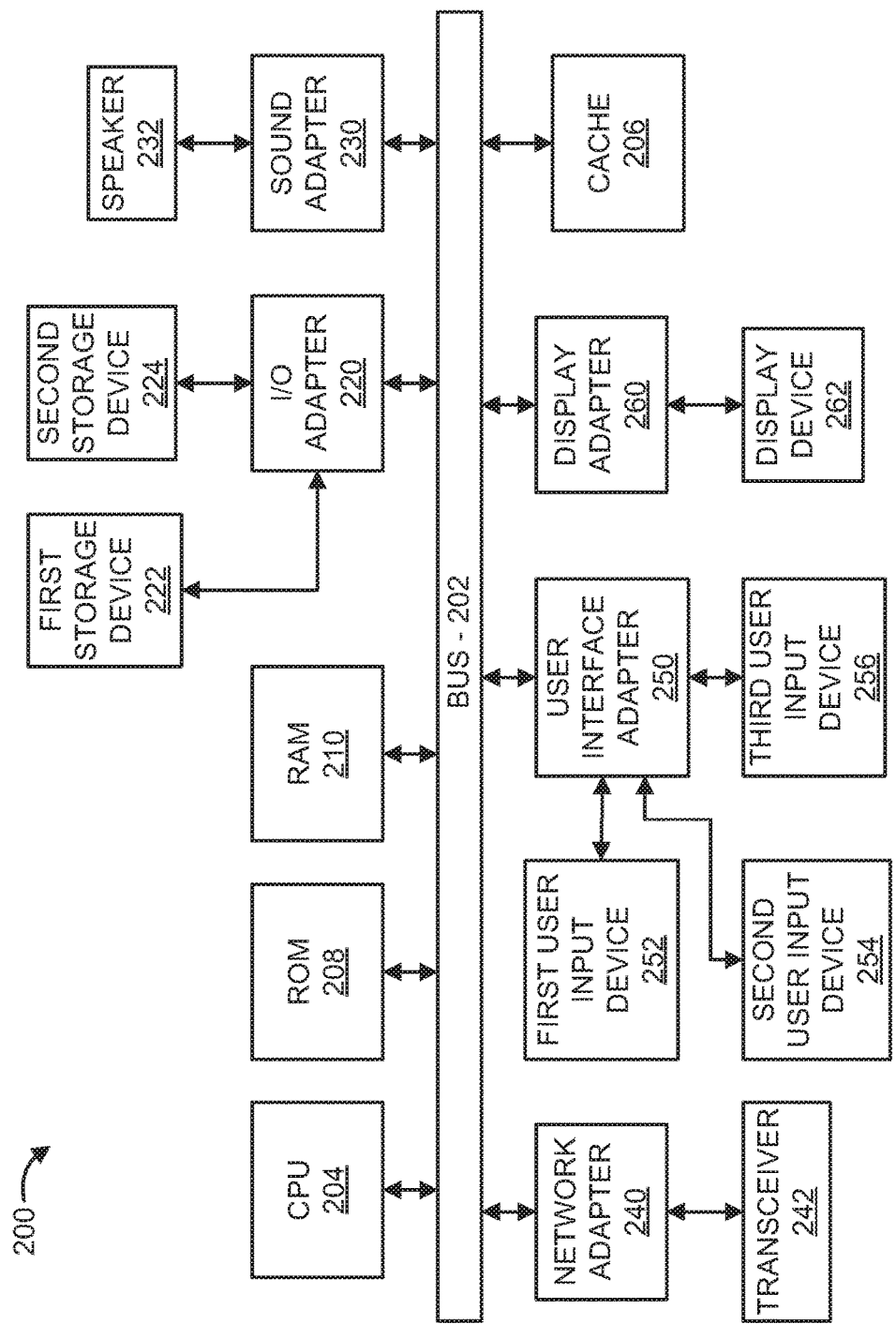
FIG. 2 shows an exemplary processing system for determining geolocation exclusion zones of animals using an unmanned aerial vehicle, in accordance with an embodiment of the present principles.

Now referring to FIG. 2, with continued reference to FIG. 1, an exemplary processing system 200 to which the present principles may be applied, in accordance with an embodiment, is illustratively depicted. The processing system 200 includes at least one processor, such as a computer processing unit (CPU) 204, operatively coupled to other components via a system bus 202. A cache 206, a Read Only Memory (ROM) 208, a Random Access Memory (RAM) 210, an input/output (I/O) adapter 220, a sound adapter 230, a network adapter 240, a user interface adapter 250, and a display adapter 260 are operatively coupled to the system bus 202.

A first storage device 222 and a second storage device 224 are operatively coupled to system bus 202 by the I/O adapter 220. The storage devices 222 and 224 can be any of a disk storage device (e.g., a magnetic or optical disk storage device), a solid state magnetic device, etc. The storage devices 222 and 224 can be the same type of storage device or different types of storage devices. In one embodiment, database images and/or profiles of an animal may be stored on the first storage device 222 and/or the second storage device 224 for comparison with images obtained by the camera 110 of FIG. 1.

A speaker 232 is operatively coupled to system bus 202 by the sound adapter 230. In one embodiment, the unmanned aerial vehicle 102 may be configured to generate an avoidance response by providing an audio signal, such as a beep and/or sound of a predator animal, from the speaker 232.

A transceiver 242 is operatively coupled to system bus 202 by network adapter 240. A display device 262 is operatively coupled to system bus 202 by display adapter 260. In an embodiment, the display device 262 may be configured to display geolocation information and/or exclusion zones provided by the transceiver 242. In some embodiments, the display device 262 may display, to a user, a virtual map having at least one exclusion zone and/or information related to a detected animal. For example, the display device 262 may display exclusion zones (e.g., where human interaction with the detected animal should be avoided, where barriers should be constructed, etc.) and/or non-exclusion zones (e.g., where human interaction is safe, where industrial development may be constructed, etc.). In some embodiments, the virtual map displayed on the display device 262 may be used to further track animal migration routes for purposes of, but not limited to, road development and/or coordinating traffic patterns (e.g., flight patterns) within exclusion zones and/or non-exclusion zones.

A first user input device 252, a second user input device 254, and a third user input device 256 are operatively coupled to system bus 202 by user interface adapter 250. The user input devices 252, 254, and 256 can be any type of input device, including but not limited to, a keyboard, a mouse, a keypad, an image capture device, a motion sensing device, a microphone, a device incorporating the functionality of at least two of the preceding devices, and so forth. Other types of input devices can also be used while maintaining the spirit of the present principles. The user input devices 252, 254, and 256 can be the same type of user input device or different types of user input devices. The user input devices 252, 254, and 256 are used to input and output information to and from system 200.

The processing system 200 may also include other elements (not shown) or may omit some elements as shown. For example, various other input devices and/or output devices can be included in processing system 200 depending upon the particular implementation of the same, such as various types of wireless and/or wired input and/or output devices. Moreover, additional processors, controllers, memories and so forth, in various configurations, can also be utilized. These and other variations of the processing system 200 are readily contemplated.

Referring now to FIG. 3, with continued reference to FIG. 1, an exemplary system 300 for an advanced unmanned aerial vehicle 102 for determining geolocation exclusion zones of animals is shown, in accordance with an embodiment of the present principles. The system 300 includes a steering controller 302, a navigation unit 304, a monitoring device 306, an identification device 308, a database 310, a tag reader 312, a risk analysis device 314, a mapping device 316, a deterrence generator 318, a storage device 320, and/or a transceiver 322.

The steering controller 302 may be configured to control movement of the unmanned aerial vehicle 102. In one embodiment, the steering controller 302 may include a motor, such as motor 107 in FIG. 1. In some embodiments, the steering controller 302 may control the aerial movement of the unmanned aerial vehicle 102 by controlling the at least one movement mechanism 106 and/or motor 107 illustrated in FIG. 1. For example, the steering controller 302 may control aerial movement of the unmanned aerial vehicle 102 by sending control signals to the at least one movement mechanism 106 and/or motor 107.

In an embodiment, the steering controller 302 may be configured to control movement of the unmanned aerial vehicle 102 by controlling the rotational speed(s) and/or rotational direction(s) of each of the movement mechanisms 106 independently. For example, the steering controller 302 may be configured to rotate each of the movement mechanisms 106 in a single direction, or alternatively, the steering controller 302 may be configured to rotate each of the movement mechanisms 106 in opposing directions. In one embodiment, the steering controller 302 may be configured to control movement of the unmanned aerial vehicle 102 to move the unmanned aerial vehicle 102 out of range of an animal and/or to move the unmanned aerial vehicle 102 around or over difficult terrain and/or obstacles (e.g., trees, mountains, etc.).

In another embodiment, the steering controller 302 may control the aerial movement of the unmanned aerial vehicle 102 based on geolocation information for exclusion zones, detection of animals and/or objects, and/or particular animal characteristics. For example, the steering controller 302 may provide aerial movement to the unmanned aerial vehicle 102 to detect and/or track the presence of animals and to further generate geolocation information of exclusion zones. The steering controller 302 may also control the speed and/or power of the movement mechanism(s) 106 and/or motor 107. In some embodiments, the steering controller 302 may provide aerial movement to the movement mechanism(s) 106 and/or motor 107 of the unmanned aerial vehicle 102 to steer the unmanned aerial vehicle 102 away from a detected migration route of an animal, and/or to avoid interaction between the unmanned aerial vehicle 102 and the detected animal. In yet a further embodiment, the steering controller 302 may provide movement for the unmanned aerial vehicle 102 to avoid collision between the unmanned aerial vehicle 102 and an object, such as an animal, a tree, building, or other structure.

In a further embodiment, the system 300 may include a navigation unit 304, such as a global positioning system (GPS). The navigation unit 304 may provide location information for particular geolocations to the steering controller 302 and/or mapping device 316. For example, the navigation unit 304 may include map coordinates of a particular area and may provide such information to the steering controller 302, such that the steering controller 302 may direct the unmanned aerial vehicle 102 to a particular location. In some embodiments, the navigation unit 304 may provide gradient information of the landscape for a particular location to the steering controller 304, such that the steering controller 304 avoids collision between the unmanned aerial vehicle 102 with landscape features, such as mountains, cliffs, etc.

In an embodiment, the system 300 may include a monitoring device 306. The monitoring device 306 may include a camera, a sensor, a radar system or similarly functioning system to track geolocation information associated with at least one animal from the unmanned aerial vehicle. In some embodiments, the monitoring device 306 may track an animal and/or detect oncoming objects. Oncoming objects may include, but are not limited to, animals, structures (e.g., buildings, bridges, etc.), landscapes and/or landscape features (e.g., trees, mountains, etc.). The monitoring device 306 may detect/track an object by monitoring the distance between the object and the unmanned aerial vehicle 102.

For example, if the distance between the object and the unmanned aerial vehicle 102 remains the same and the unmanned aerial vehicle 102 is stationary (e.g., not moving), the monitoring device 306 may identify the object as a stationary object. In addition, if the distance between the object and the unmanned aerial vehicle 102 remains the same and the unmanned aerial vehicle 102 is non-stationary (e.g., moving), the monitoring device 306 may identify the object as a non-stationary object (e.g., an object that is traveling in the same direction and the same speed as the unmanned aerial vehicle 102). In an embodiment, if the unmanned aerial vehicle 102 relocates towards the detected object and the distance between the detected object and the unmanned aerial vehicle 102 increases, the monitoring device 306 may identify the detected object as a moving object (e.g., non-stationary object) and/or a retreating object (e.g., the object is moving away from the unmanned aerial vehicle 102). Conversely, if the unmanned aerial vehicle 102 relocates towards the detected object and the distance between the detected object and the unmanned aerial vehicle 102 decreases, the monitoring device 306 may identify the object as a moving object and/or an oncoming object (e.g., the object is moving toward from the unmanned aerial vehicle 102). In some embodiments, the monitoring device 306 may be configured to determine the velocity of the oncoming object using a radar system (not shown).

In an embodiment, the monitoring device 306 may be configured to detect and/or track geolocation information associated with at least one animal, including nesting sites and/or migration routes. In further embodiments, the monitoring device 306 may detect stationary objects (e.g., trees, buildings, etc.) for navigation guidance.

The monitoring device 306 may include a camera, such as camera 110 of FIG. 1, and/or any type of processor-based monitoring device to provide visual feedback, including still images and/or video sequences, to the unmanned aerial vehicle 102. The monitoring device 306 may capture an image of a detected animal and/or geolocation information associated with a detected animal, such as geolocation coordinates where the detected animal is located. For example, the monitoring device 306 may identify the location of a particular animal population and/or location of a migration route of an animal and/or animal population. In an embodiment, the monitoring device 306 may provide the geolocation information, including map coordinates associated with the captured image, to the mapping device 316 to generate exclusion zones, which will be described in further detail below. In further embodiments, the monitoring device 306 may capture an image of nesting sites of animals and/or geolocation coordinates of the nesting sites, which may be employed to generate exclusion zones.

The system 300 may include an identification device 308. The identification device 308 may be mounted on the unmanned aerial vehicle and may identify the animal and/or track a position of the at least one animal over time. In an embodiment, the identification device 308 may, in combination with a database 310 configured to store database images of an animal, identify characteristics of the detected/tracked animal, such as animal species information, anatomical characteristics of the animal, endangered status, etc. In some embodiments, the identification device 308 may compare a captured image, such as the image obtained by the monitoring device 306, with database images to accurately identify the animal, a migration route associated with the animal, and/or nesting site associated with the animal. The database 310 may include further identification information relating to an animal, such as whether the animal is an endangered species, likelihood of the animal to attack, anatomical characteristics of the animal, successful avoidance responses associated with the animal, etc. Accordingly, the identification information provided by the database images and/or database 310 may provide further information relating to the detected animal. In some embodiments, the identification device 308 may extract such identification information relating to the detected animal, associate the detected animal with the identification information provided by the database 310, and/or store the associated information for the detected animal in the storage device 320.

In an embodiment, the identification device 308 may obtain an image of one or more nests and/or one or more eggs located in a nest and, using image comparison with the database 310, the identification device 308 may compare the captured image to database images to determine one or more of the following: type of nest, type of egg located in nest, number of eggs within the nest, type of animal located in nest, type of animal associated with nest and/or egg, amount of nests within the geolocation, etc. The geolocation coordinate information corresponding to the nesting site may be provided to the mapping device 316 to generate exclusion zones associated with the nesting sites.

The system 300 may include a tag reader 312, such as a Radio Frequency Identification (RFID) reader. The tag reader 312 may be configured to extract identification information from a particular animal that has been detected/tracked. For example, some animals, including endangered species, have been tagged, namely that the animals have an identification tag attached somewhere on an animal's extremities and/or implanted under the animal's skin. Examples of such tags include, but are not limited to, internal microchip implant technology (e.g., an integrated circuit implanted under the skin of an animal), external microchips (e.g., RFID ear tags), leg rings, wing tags, fin clippings, acoustic tags and/or adhesive tags. The tag reader 312 may be configured to extract the identification information stored on such tags. For example, the tag reader 312 may employ passive RFID technology to read and/or scan the tag (e.g., integrated circuit) to extract the identification information stored on the tag, which may include identification number, migration route information, history of the detected animal (e.g., attack records), etc.

In an embodiment, the tag reader 312 may extract animal identification information stored on the tag attached to a detected animal when the monitoring device 306 detects the animal. In some embodiments, the tag reader 312 may provide such animal identification information to the identification device 308, such that the identification device 308 may store the animal identification information associated with the detected animal in the storage device 320. The tags may include animal identification information, such as an identification number and/or animal characteristics particular to the specific animal, which may be used to identify and/or track the animal. For example, a tag may include information relating to an animal's likelihood to attack a human and/or the unmanned aerial vehicle 102, and/or an animal's likelihood to be scared by interactions with a human and/or the unmanned aerial vehicle 102. In further embodiments, the tag reader 312 may extract previous location coordinates indicating a migration route of the detected animal.

The risk analysis device 314 may be configured to evaluate a level of risk associated with and/or presented by the detected animal, such as the animal's likelihood and/or history to attack a human and/or the unmanned aerial vehicle 102, an animal's likelihood to be scared by interactions with a human and/or the unmanned aerial vehicle 102, etc. For example, when nesting sites are detected by the monitoring device 306 and/or identified by the identification device 308, the risk analysis device 314 may determine a high level of risk that an animal will attack the unmanned aerial vehicle 102 to protect the nest. In some embodiments, the risk analysis device 314 may determine if deterrence action and/or an avoidance response is to be performed. For example, deterrence action may be generated when the level of risk, determined by the risk analysis device 314, exceeds a predetermined threshold. The predetermined threshold may, in some embodiments, be a minimum threshold to protect the safety of the detected animal, a human, and/or the unmanned aerial vehicle 102.

In an embodiment, the risk analysis device 314 may determine the level of risk presented by the detected animal based on learned behaviors of the detected animal. Learned behaviors may be determined by visually monitoring the detected animal (e.g., gazed fix on the unmanned aerial vehicle 102, arched back resembling a likelihood to pounce, etc.), and/or sensing, via an audio device, sounds made by the detected animal (e.g., honking, barking, growling, distressed sounds made by an animal, etc.) to determine a level of risk presented by the detected animal. In some embodiments, the learned behaviors may be determined by employing a camera and/or acoustic sensor, such as camera 110 and/or sensor 112 of FIG. 1. The learned behaviors and/or the level of risk associated with the detected animal may be stored in storage device 320 and may be utilized in future monitoring within the same vicinity and/or to generate a deterrence action.

In a further embodiment, the risk analysis device 314 may provide updates to previously learned behaviors and/or level of risk of detected animals stored in the storage device 320. For example, the storage device 320 may provide previously learned behaviors and/or a previously determined level of risk of a detected animal. The risk analysis device 314 may determine a new level of risk, by, for example, monitoring the detected animal, and may update the learned behaviors and/or the level of risk stored in the storage device 320. In some instances, the detected animal may become accustomed to the sound of the unmanned aerial vehicle 102 such that the detected animal is no longer scared and/or threatened by the unmanned aerial vehicle 102. Conversely, the detected animal 102 may become more aggressive toward the unmanned aerial vehicle 102. In such scenarios, the risk analysis device 314 may provide updates to the stored learned behaviors and/or levels of risk such that actions of the unmanned aerial vehicle 102 (e.g., deterrence action) may be tailored according to the most up-to-date information of the detected animal.

In some embodiments, the risk analysis device 314 may determine the level of risk presented by the detected animal based on statistics of the detected animal. For example, the risk analysis device 314 may employ known statistics of risk of an animal group (e.g., tigers) when the detected animal belongs to the animal group (e.g., the detected animal is a tiger). The risk analysis device 314 may determine, based on known statistics of the animal group, the level of risk of the detected animal to attack a human and/or the unmanned aerial vehicle 102, and/or the detected animal's likelihood to be scared by interactions with a human and/or the unmanned aerial vehicle 102. The statistics of the animal group and/or level of risk associated with the detected animal may be stored in storage device 320 and may be utilized in future monitoring within the same vicinity and/or to generate a deterrence action.

In further embodiments, the system 300 may include a mapping device 316. The mapping device 316 may be coupled to the monitoring device 306 to determine locations where at least one animal has traversed and to identify where an encounter with the at least one animal is reduced. In an embodiment, the mapping device 316 may generate geolocation exclusion zones on a virtual map. In some embodiments, the mapping device 316 may generate exclusion zones based on the characteristics and the geolocation information associated with the detected animal, such as geolocation coordinates of nesting sites and/or migration routes associated with detected animal. For example, the mapping device 316 may identify, on a virtual map, particular locations where nesting sites, migration routes, and/or endangered animal presence have been detected and indicate such locations as exclusion zones.

Exclusion zones may include any zones in a geographic area in which specific activities may be restricted and/or prohibited temporarily or permanently until further monitoring of the geolocation is performed. In some embodiments, the mapping device 316 may be configured to generate a virtual map indicating exclusion zones and non-exclusion zones. The mapping device 316 may be further configured to generate exclusion zones based on risk assessment of the detected animal(s) and/or indicate a level of risk of an exclusion zone. For example, the mapping device 316 may rank an exclusion zone and/or identify a particular exclusion zone as "highly dangerous" and/or "hazardous" due to a high level of risk presented by the detected animal.

The system 300 may further include a deterrence generator 318. The deterrence generator 318 may be configured to generate an avoidance response and/or deterrence action for the unmanned aerial vehicle 102. It should be understood that avoidance response and deterrence action may be the same action. In an embodiment, the deterrence generator 318 may provide relocation information to the steering controller 302 to relocate the unmanned aerial 102. Relocation information may be provided by the deterrence generator 318 when, for example, the monitoring device 306 detects an oncoming object (e.g., a bird flying) and/or stationary object within a collision plane of the unmanned aerial vehicle 102, and/or a high level of risk that a detected animal may attack the unmanned aerial vehicle 102.

Avoidance responses may include, but are not limited to, determining noise level generated by the unmanned aerial vehicle 102, and activating at least one sound baffle 108 and/or temporarily deactivating devices on the unmanned aerial vehicle 102 to suppress any noise generated by the unmanned aerial vehicle 102, transmit harmless electromagnetic signals to deter an animal away from the unmanned aerial vehicle 102, generating a sound and/or light signal to deter an animal away from the unmanned aerial vehicle 102, mimicking predator behavior, and/or any other action to produce an avoidance response in the detected animal.

In some embodiments, the deterrence generator 318 may generate an avoidance response based on the type of animal detected, including likelihood to cause harm, level of risk, successfulness of an avoidance response, type and behavior of predator to the detected animal, etc. Accordingly, when the identification device 308 identifies a particular animal (e.g., a bird having a particular auditory system), the deterrence generator 318 may generate an avoidance response that is optimized based on assessment of the detected animal (e.g., dependent on the specific animal and/or animal species).

According to one embodiment, the deterrence generator 318 may transmit electromagnetic signals having a default setting (e.g., a fixed frequency). In some embodiments, the deterrence generator 318 may transmit an appropriate frequency for the electromagnetic signals based on the characteristics of the detected animal, determined by the identification device 308 to deter the detected animal from a geolocation. For example, the identification device 308 may identify a bird having an auditory system capable of detecting electromagnetic signals within a certain range, and the deterrence generator 318 may transmit electromagnetic signals within the certain range, such that the avoidance response is optimized based on the type of bird detected. Accordingly, the deterrence generator 318 may transmit complex pulse trains that may evoke a biologically significant response within certain recipient animals.

In a further embodiment, the deterrence generator 318 may mimic predator behavior to produce an avoidance response in the detected animal. For example, when the monitoring device 306 detects an oncoming bird flying within a collision plane of the unmanned aerial vehicle 102 and/or within a particular geolocation, the deterrence generator 318 may mimic the behavior of a predator animal of the detected bird, such as the bird sounds of a hawk, to produce an avoidance response in the detected animal, including deterring the detected bird from the particular geolocation.

The system 300 may include a transceiver 322. The transceiver 322 may be any device configured to transmit and/or receive information. In an embodiment, the transceiver 322 may be configured to communicate with and/or provide feedback to a secondary transceiver device (e.g., secondary transmitter/receiver), such as the secondary transmitter/receiver device 124 of FIG. 1. In an embodiment, the transceiver 322 may provide visual feedback of a detected object, identification information of a detected animal (e.g., type of animal detected, geolocation information of the detected animal, geolocation coordinates of migration route, etc.), risk analysis information of a detected animal, and/or avoidance response information, including avoidance response instructions, to one or more secondary transceivers. In a further embodiment, the transceiver 322 may provide exclusion zone information generated by the mapping device 316 to the secondary transceivers.

In an embodiment, the transceiver 322 may be configured to communicate with a plurality of secondary transceivers to produce an avoidance response in the detected animal. It is readily contemplated that the secondary transceivers may be configured to perform the functions of the deterrence generator 318. For example, the deterrence generator 318 may instruct the secondary transceivers to transmit electromagnetic signals towards a detected animal to deter the detected animal from a particular geolocation. In further embodiments, the deterrence generator 318 may instruct the secondary transceiver(s) to distract the detected animal from the unmanned aerial vehicle 102 for a sufficient amount of time to allow the unmanned aerial vehicle 102 to relocate away from the vicinity of the detected animal. It is to be appreciated that the secondary transceivers described herein are merely illustrative and, thus, the present principles can be used with other components and/or secondary transceiver devices while maintaining the scope of the present principles.

In the embodiment shown in FIG. 3, the elements thereof may be interconnected by a bus 301. However, in other embodiments, other types of connections can also be used. Moreover, in an embodiment, at least one of the elements of system 300 is processor-based. Further, while one or more elements may be shown as separate elements, in other embodiments these elements can be combined as one element. These and other variations of the elements of system 300 are readily determined by one of ordinary skill in the art, given the teachings of the present principles provided herein.

Figure 4:
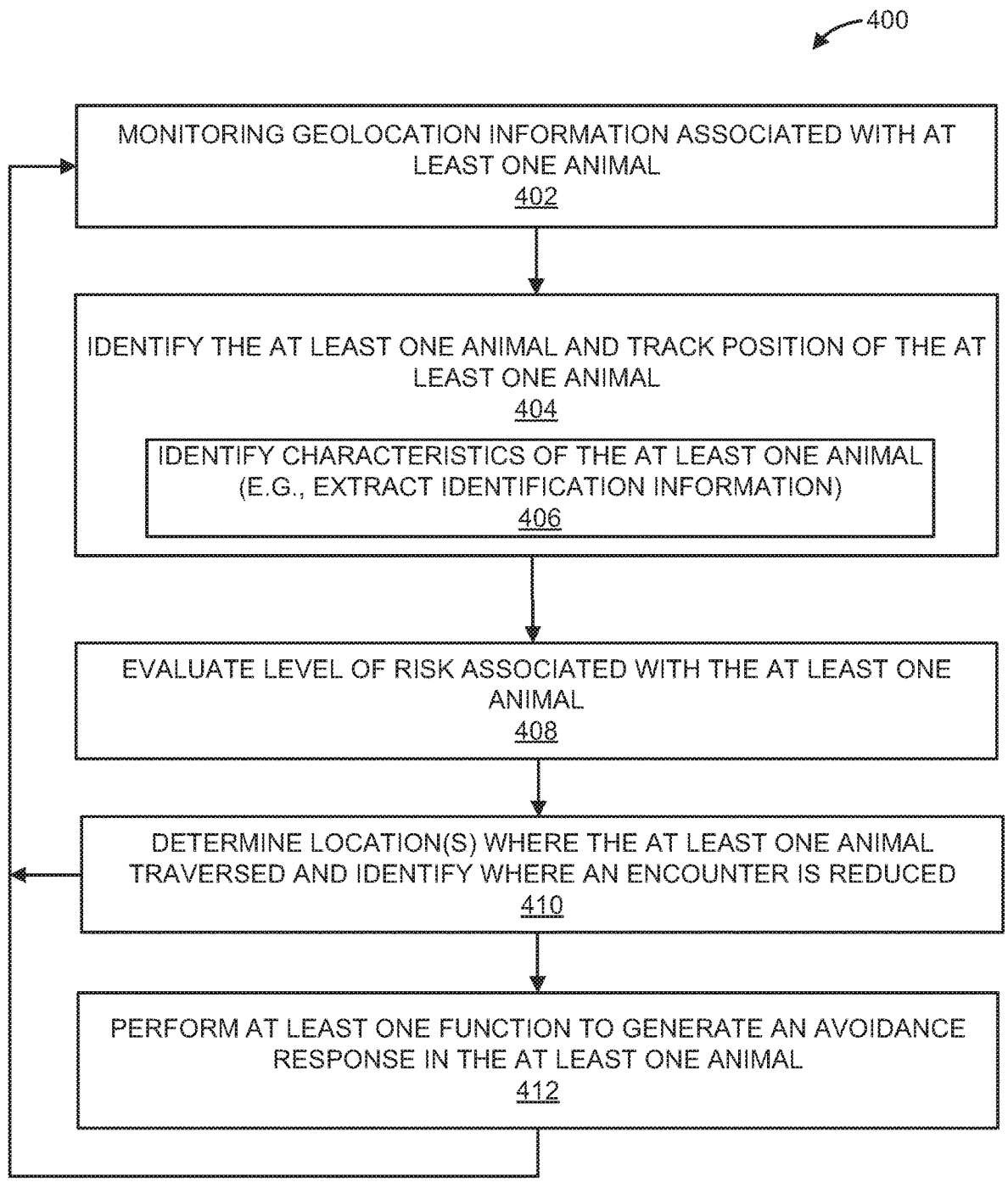
FIG. 4 shows an exemplary method for determining geolocation exclusion zones of animals using an unmanned aerial vehicle, in accordance with an embodiment of the present principles.

Now referring to FIG. 4, with continued reference to FIGS. 1-3, FIG. 4 shows an exemplary method 400 for generating geolocation exclusion zones of animals using an unmanned aerial vehicle 102, in accordance with an embodiment of the present principles.

In block 402, the method 400 may include tracking, using a processor-based monitoring device, such as monitoring device 306 of FIG. 3, geolocation information associated with at least one animal from the unmanned aerial vehicle 102. For example, the processor-based monitoring device 306 may provide images of geolocations and/or geolocation coordinate information corresponding to, for example, where animals are detected, migration routes of animals, and/or nesting sites of animals. In an embodiment, monitoring may include receiving audio and/or video input from camera 110 and/or sensor 112 of FIG. 1. For example, monitoring the geolocation information associated with at least one detected animal may include capturing images from camera 110 and comparing the captured images to stored images to determine the geolocation and/or identify an object as an animal using image matching and/or image comparison techniques.

In an embodiment, the method 400 may include identifying the at least one animal and tracking a position of the at least one animal over time, as illustrated in block 404. The position of the at least one animal may include map coordinates associated with at least one of migration routes of the animal and/or nesting sites of the at least one animal. In some embodiments, the method may include identifying characteristics of the animal, as illustrated in block 406. The characteristics of the animal may include animal species information, anatomical characteristics of the at least one animal, and/or endangered status, etc. In further embodiments, the characteristics relating to a detected animal may include endangered species status, likelihood of the detected animal to attack, successful avoidance responses associated with the detected animal, etc. Accordingly, the characteristics may provide further information relating to the detected animal. In an embodiment, identifying the characteristics may including extracting identification information relating to the animal stored on a tag attached to the animal. For example, a tag attached to the detected animal may be read, using a tag reader, to extract identification information associated with the animal, wherein the identification information is stored on the tag, such as a microchip.

In block 408, the method 400 may include evaluating a level of risk presented by the detected animal, such as a risk to attack a human and/or the unmanned aerial vehicle 102, and/or an animal's likelihood to be scared by interactions with a human and/or the unmanned aerial vehicle 102. For example, a level of risk may determine the animal's likelihood to attack the unmanned aerial vehicle 102 to protect a nest. In an embodiment, evaluating the level of risk may include visually monitoring the detected animal to determine whether the detected animal is performing learned behaviors, such as a gazed fix on the unmanned aerial vehicle 102, arched back resembling a pounce, distressed sounds made by the detected animal, etc. In further embodiments, evaluating the detected animal may be based on known statistics of the animal group to which the detected animal belongs to.

In block 410, the method 400 may include generating at least one exclusion zone on a virtual map based on the characteristics and the geolocation information associated with the at least one animal. In some embodiments, generating exclusion zones may be based on geolocation coordinates of nesting sites, or geolocation coordinates associated with detected animal presence, such as nesting sites, migration routes, and/or endangered animal presence. In a further embodiment, generating exclusion zones may be based on type of animal detected and/or risk assessment of the detected animal(s). The at least one exclusion zone, virtual map, and/or information related to the detected animal may be displayed to a user on, for example, the display device 262 of FIG. 2.

In block 412, the method 400 may include performing at least one function to generate an avoidance response in the detected animal. In some embodiments, the at least one function is performed based on the level of risk presented by the detected animal and/or when a predetermined threshold for the level of risk is exceeded. The predetermined threshold may, in some embodiments, be a minimum threshold to protect the safety of the detected animal, a human, and/or the unmanned aerial vehicle 102. In some embodiments, the at least one function may be selected based on anatomical characteristics of the detected animal. The at least one function may include, but is not limited to, relocating the unmanned aerial vehicle 102, reducing noise generating by the unmanned aerial vehicle 102, transmitting at least one signal to the detected animal, and/or communicating with a secondary device configured to distract the detected animal.

In a further embodiment, the blocks of 402-412 may be continuously repeated. For example, after generating an exclusion zone and/or generating an avoidance response in the detected animal, the unmanned aerial vehicle 102 may determine further geolocation information associated with the at least one detected animal, which, in some embodiments, may provide geolocation information relating to a migration pattern of the detected animal.

Figure 5:
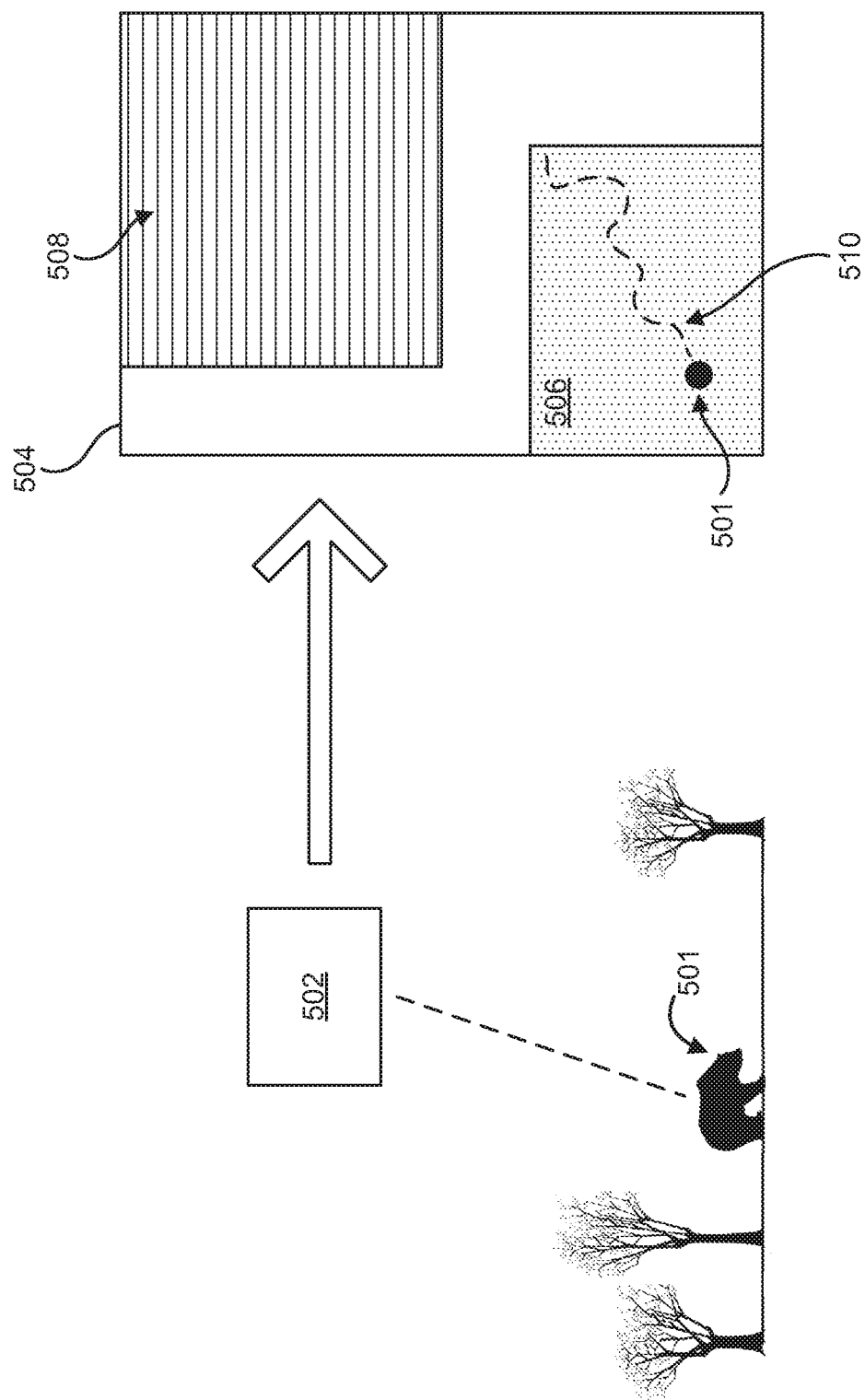
FIG. 5 shows an exemplary system/method for determining geolocation exclusion zones of animals using an unmanned aerial vehicle, in accordance with an embodiment.

Now referring to FIG. 5, an exemplary system/method for determining geolocation exclusion zones of animals using an unmanned aerial vehicle is illustratively depicted. As shown in FIG. 5, the unmanned aerial vehicle 502, which may include any of system 100 of FIG. 1, system 200 of FIG. 2, and/or system 300 of FIG. 3, may track and identify an animal 501. In some embodiments, the unmanned aerial vehicle 502 may track a position of the animal 502 over time (e.g., hours, days, months, years, etc.). The unmanned aerial vehicle 502 may determine locations where the animal 502 has traversed and identify where an encounter with the at least one animal is reduced. For example, the unmanned aerial vehicle 502 may generate a virtual map 504 having at least one exclusion zone 506 and/or non-exclusion zone 508. The non-exclusion zone 508 may include areas where an encounter with the animal 502 is reduced. The exclusion zone 506 may include any area in which the animal 501 is detected and/or tracked and, in some embodiments, may include a migration route 510 associated with the animal 501. The virtual map 504 may identify exclusion zones where human interaction and/or development should be temporarily avoided. In some embodiments, the virtual map 504 may be employed to track evolving migration routes for purposes of, but not limited to, road development and/or coordinating traffic patterns within exclusion zones.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
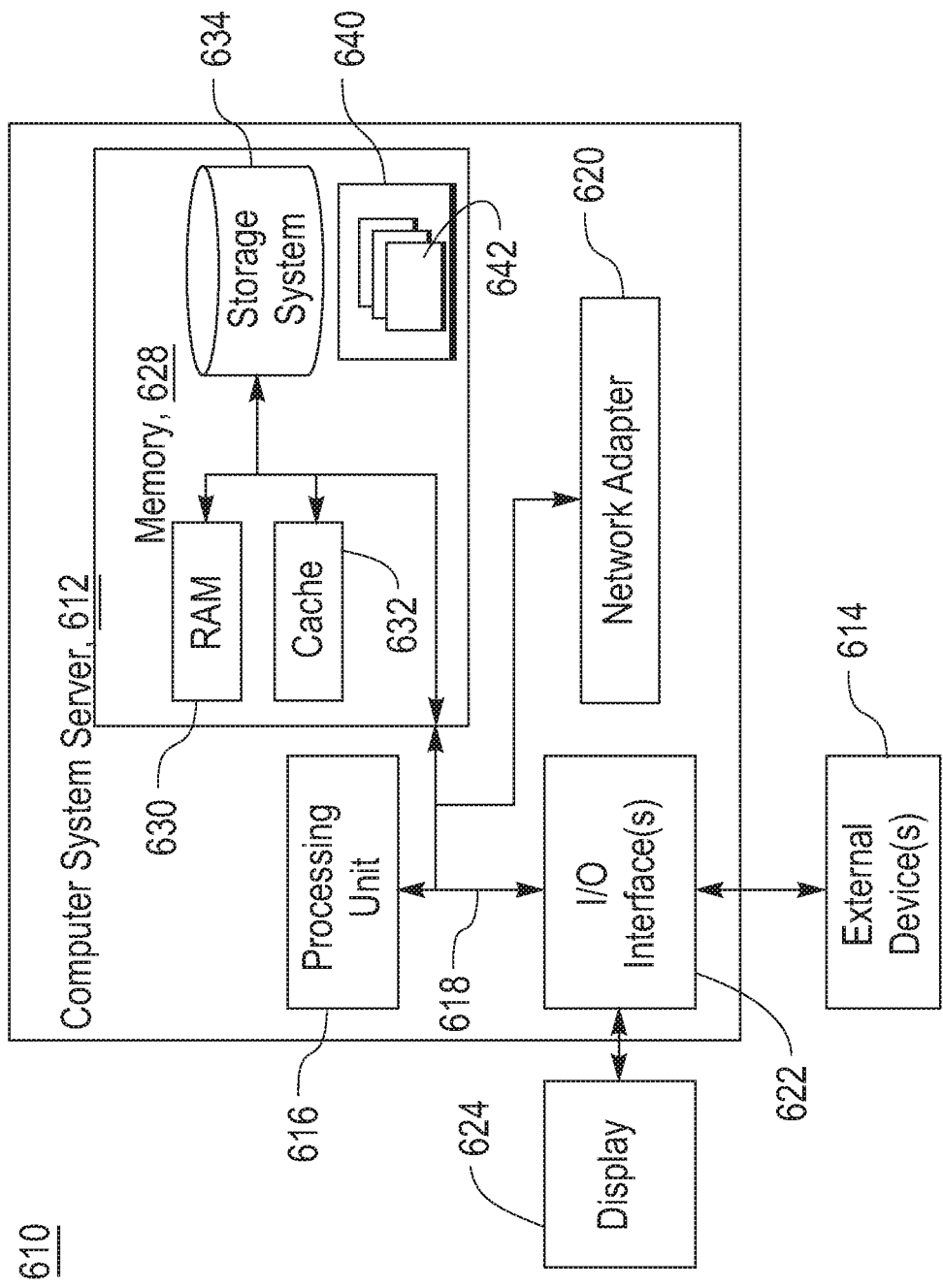
FIG. 6 shows an exemplary cloud computing node, in accordance with an embodiment of the present principles.

Referring now to FIG. 6, a schematic of an example of a cloud computing node 610 is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
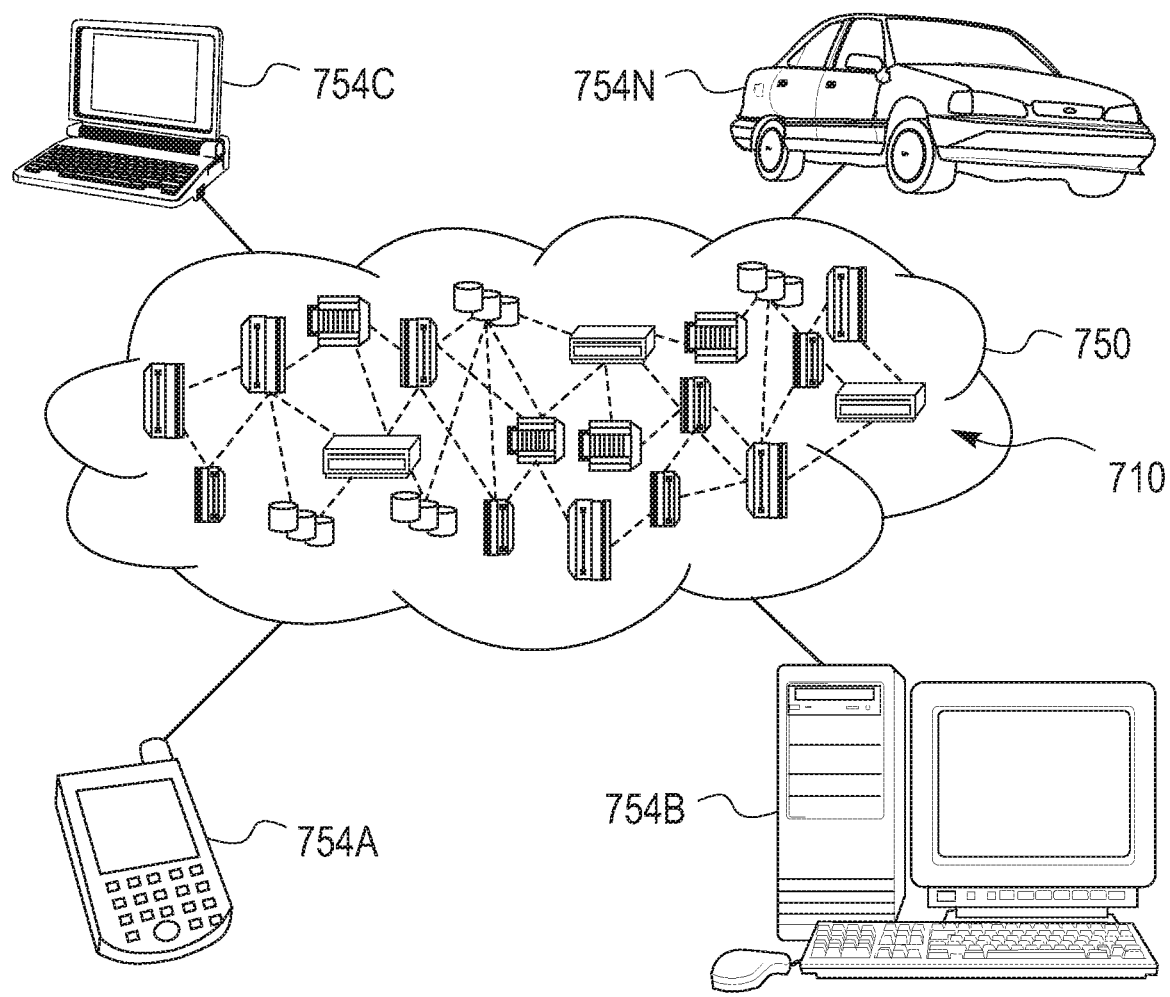
FIG. 7 shows an exemplary cloud computing environment, in accordance with an embodiment of the present principles.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and exclusion zone identification.

Having described preferred embodiments of an unmanned aerial vehicle for generating geolocation exclusion zones for animals, which are intended to be illustrative and not limiting, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. An unmanned aerial vehicle for determining geolocation exclusion zones, the unmanned aerial vehicle comprising:
   an identification device including a database of reference images stored in a storage device, the identification device being mounted on an unmanned aerial vehicle, and configured to identify at least one object by comparing images captured by a camera mounted on the unmanned aerial vehicle against the reference images, and track a position of the at least one object over time; and
   a mapping device including a global positioning system (GPS) receiver and coupled to the unmanned aerial vehicle, the mapping device being configured to determine locations where the at least one object has traversed and identify where an encounter with the at least one object is reduced.

2. The unmanned aerial vehicle of claim 1, wherein the position of the at least one object may include map coordinates associated with routes of the at least one object.

3. The unmanned aerial vehicle of claim 1, wherein the identification device is further configured to identify characteristics of the at least one object, the characteristics including at least one of object type information, physical characteristics of the at least one object, and rarity status.

4. The unmanned aerial vehicle of claim 1, wherein the identification device is further configured to extract identification information relating to the at least one object stored on a tag attached to the at least one object.

5. The unmanned aerial vehicle of claim 1, further comprising a risk analysis device having a processor configured to evaluate a level of risk associated with the at least one object by employing one or more sensors to identify a behavior of the at least one object corresponding to learned behaviors of the at least one object stored in the storage device.

6. The unmanned aerial vehicle of claim 5, further comprising a deterrence generator configured to perform at least one function based on the level of risk, wherein the at least one function generates an avoidance response in the at least one object such that interactions between the unmanned aerial vehicle and the at least one object are avoided.

7. The unmanned aerial vehicle of claim 6, wherein the at least one function includes relocating the unmanned aerial vehicle, reducing noise generated by the unmanned aerial vehicle, transmitting at least one signal to the at least one object, and communicating with a secondary device that, when activated, distracts the at least one object.

8. The unmanned aerial vehicle of claim 6, wherein the deterrence generator is further configured to select the at least one function based on physical characteristics of the at least one object.

9. A method for determining geolocation exclusion zones using an unmanned aerial vehicle, the method comprising:
   identifying at least one object and tracking a position of the at least one object over time by comparing images captured by a camera mounted on an unmanned aerial vehicle against a database of reference images; and
   determining locations where the at least one object has traversed and identifying where an encounter with the at least one object is reduced.

10. The method of claim 9, wherein the position of the at least one animal may include map coordinates associated with routes of the at least one object.

11. The method of claim 9, wherein identifying the at least one animal includes identifying characteristics of the at least one animal, the characteristics including at least one of object type information, physical characteristics of the at least one object, and rarity status.

12. The method of claim 9, wherein identifying the at least one animal includes extracting identification information relating to the at least one object stored on a tag attached to the at least one object.

13. The method of claim 9, further comprising evaluating a level of risk associated with the at least one object.

14. The method of claim 13, further comprising performing at least one function based on the level of risk, wherein the at least one function generates an avoidance response in the at least one object such that interactions between the unmanned aerial vehicle and the at least one object are avoided.

15. The method of claim 14, wherein the at least one function includes relocating the unmanned aerial vehicle, reducing noise generated by the unmanned aerial vehicle, transmitting at least one signal to the at least one object, and communicating with a secondary device that, when activated, distracts the at least one object.

16. The method of claim 14, further comprising selecting the at least one function based on physical characteristics of the at least one object.

17. A non-transitory computer readable storage medium comprising a computer readable program for determining geolocation exclusion zones using an unmanned aerial vehicle, wherein the computer readable program, when executed on a computer, causes the computer to execute:
   identifying at least one object by comparing images captured by a camera mounted on the unmanned aerial vehicle against a database of reference images, and tracking a position of the at least one object over time; and
   determining locations where the at least one object has traversed and identifying where an encounter with the at least one object is reduced.

18. The non-transitory computer readable storage medium of claim 17, wherein identifying the at least one object includes identifying characteristics of the at least one object, the characteristics including at least one of object type information, physical characteristics of the at least one object, and rarity status.

19. The non-transitory computer readable storage medium of claim 17, wherein identifying the at least one object includes extracting identification information relating to the at least one object stored on a tag attached to the at least one object.

20. The non-transitory computer readable storage medium of claim 17, further comprising evaluating a level of risk associated with the at least one object.

* * * * *